United States Patent
Zoppelt et al.

(10) Patent No.: US 10,573,095 B2
(45) Date of Patent: Feb. 25, 2020

(54) METHOD AND SYSTEM FOR THE DIAGNOSIS OR CONFIGURATION OF A VEHICLE

(71) Applicant: Dr. Ing. h.c. F. Porsche Aktiengesellschaft, Stuttgart (DE)

(72) Inventors: Gerald Zoppelt, Weissach-Flacht (DE); Markus Koch, Stuttgart (DE); Roland Herberth, Weissach-Flacht (DE); Sven Conradi, Ammerbuch-Altingen (DE); Ruediger Roppel, Flieden (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 6 days.

(21) Appl. No.: 15/848,122

(22) Filed: Dec. 20, 2017

(65) Prior Publication Data

US 2018/0182184 A1   Jun. 28, 2018

(30) Foreign Application Priority Data

Dec. 22, 2016  (DE) .......................... 10 2016 125 294

(51) Int. Cl.
| | |
|---|---|
| *G07C 5/00* | (2006.01) |
| *H04L 29/08* | (2006.01) |
| *G06F 9/4401* | (2018.01) |
| *G06F 8/654* | (2018.01) |
| *G06F 8/61* | (2018.01) |

(52) U.S. Cl.
CPC ............ *G07C 5/008* (2013.01); *G06F 8/654* (2018.02); *G06F 9/4406* (2013.01); *H04L 67/34* (2013.01); *G06F 8/61* (2013.01)

(58) Field of Classification Search
USPC ....................................................... 701/31.4
See application file for complete search history.

(56) References Cited

U.S. PATENT DOCUMENTS

| | | | |
|---|---|---|---|
| 2005/0187680 A1 | 8/2005 | Kamdar et al. | |
| 2008/0268866 A1* | 10/2008 | Sukkarie | G07C 5/008 455/456.1 |
| 2009/0077266 A1* | 3/2009 | Alrabady | G07C 5/008 709/249 |
| 2012/0197486 A1* | 8/2012 | Elliott | G07C 5/008 701/33.2 |
| 2013/0246135 A1* | 9/2013 | Wang | G07C 5/008 705/14.4 |
| 2013/0325323 A1* | 12/2013 | Breed | G01C 21/3667 701/420 |
| 2014/0100737 A1 | 4/2014 | Haap et al. | |

(Continued)

FOREIGN PATENT DOCUMENTS

| | | |
|---|---|---|
| DE | 102011100106 A1 | 10/2012 |
| DE | 102012010723 A1 | 11/2012 |

*Primary Examiner* — Tyler D Paige
(74) *Attorney, Agent, or Firm* — Leydig, Voit & Mayer, Ltd.

(57) ABSTRACT

A method for the diagnosis and/or configuration of a vehicle includes sending, by a back end unit via an air interface to a vehicle unit, a data packet which comprises an order for the diagnosis and/or configuration of the vehicle, evaluating, by the vehicle unit, whether the diagnosis and/or a configuration of the vehicle is to be undertaken, and initiating, by the vehicle unit, the diagnosis and/or a configuration of the vehicle.

20 Claims, 3 Drawing Sheets

(56) References Cited

U.S. PATENT DOCUMENTS

| | | | |
|---|---|---|---|
| 2014/0324786 A1* | 10/2014 | Li | G06F 16/215 |
| | | | 707/690 |
| 2015/0140986 A1* | 5/2015 | Lamb | H04L 41/0659 |
| | | | 455/418 |
| 2015/0169311 A1* | 6/2015 | Dickerson | G06F 8/65 |
| | | | 717/170 |
| 2015/0170430 A1 | 6/2015 | Von Querfurt et al. | |
| 2015/0215844 A1* | 7/2015 | Davis | H04W 8/12 |
| | | | 455/432.1 |
| 2016/0335073 A1* | 11/2016 | Hong | G06F 8/65 |

\* cited by examiner

METHOD AND SYSTEM FOR THE DIAGNOSIS OR CONFIGURATION OF A VEHICLE

CROSS REFERENCE TO RELATED APPLICATIONS

This application claims benefit to German Patent Application No. DE 10 2016 125 294.8, filed Dec. 22, 2016, which is hereby incorporated by reference herein.

FIELD

The invention is based on a method for the diagnosis and/or configuration of a vehicle. The present invention also relates to a corresponding back end unit and vehicle unit.

BACKGROUND

Recall actions of vehicles into the workshops, e.g. for eliminating faults in the software of a control device, are cost- and time-intensive for the vehicle manufacturer and for the customer. However, there is no technical necessity for eliminating faults in the workshop because a diagnosis or a software update of the control device could also be performed by remote control via an air interface. However, the software should not be applied directly to the control device by mobile radio via an air interface since mobile radio links are associated with high latency and failure times and thus there is a high probability of a faulty installation of the software. The aim is achieved more completely by first downloading the software via the air interface and only after a complete download of the software to install the latter autonomously in the vehicle so that there does not have to be a stable mobile radio link during the writing phase.

From the prior art it is known that a diagnosis of vehicle components by means of a so-called diagnostic runtime script for describing diagnostic and test runs, such as e.g. by the Standard Open Test Sequence Exchange (OTX), can be performed. The diagnostic scripts are then executed at the vehicle by means of a so-called runtime API (API=Application Programming Interface) and a runtime environment. A performance control device in the vehicle can then be used for planning the sequence of various diagnostic runtime scripts.

German laid-open patent application DE 102011100106 A1, for example, describes a method and system for diagnosis of a vehicle component with a server which provides a diagnostic runtime script and an associated execution parameter of a diagnostic device in the vehicle. A script generating device is also provided in order to generate the diagnostic runtime script from a script language, e.g. OTX, and to send it to the server.

However, greater flexibility would be desirable with regard to the type of remote-controlled orders which are sent to the vehicle via the air interface. This would lead to, among other things, a generic transformability of diagnosis-specific use cases such as, e.g., reading out error stores, ECU flashing or ECU configuration (ECU=Electronic Control Unit).

SUMMARY

In an embodiment, the present invention provides a method for the diagnosis and/or configuration of a vehicle. The method includes sending, by a back end unit via an air interface to a vehicle unit, a data packet which comprises an order for the diagnosis and/or configuration of the vehicle; evaluating, by the vehicle unit, whether the diagnosis and/or a configuration of the vehicle is to be undertaken; and initiating, by the vehicle unit, the diagnosis and/or a configuration of the vehicle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
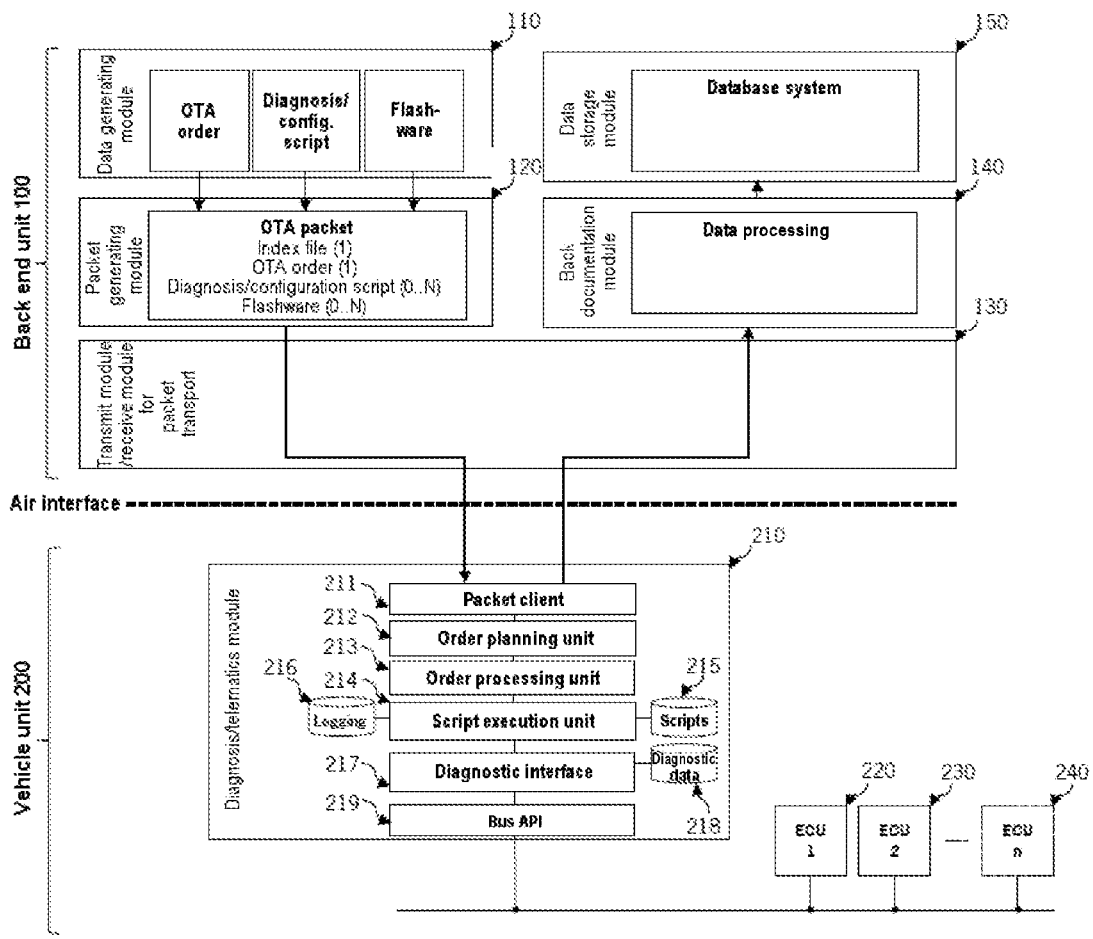
FIG. 1 shows a diagrammatic view of a back end unit and a vehicle unit according to an illustrative embodiment of the present invention.

Embodiments of the invention provide methods and systems by means of which diagnosis and/or configuration of a vehicle can be carried out by communication of a back end unit with a vehicle unit via an air interface. A diagnosis in the sense of information finding can then comprise, e.g., reading out of measurement values or error stores and a configuration of a vehicle can comprise, for example, the writing or installing of code or software such as, e.g., flashware.

According to an embodiment, a method for the diagnosis and/or configuration of a vehicle, is characterized in that a data packet which comprises an order for the diagnosis and/or configuration of the vehicle is sent by a back end unit via an air interface to a vehicle unit, the vehicle unit evaluates whether a diagnosis and/or a configuration of the vehicle is to be undertaken, and the vehicle unit initiates a diagnosis and/or a configuration of the vehicle.

According to a preferred development of the present invention, it is provided that the data packet contains an executable script for the diagnosis and/or the configuration of the vehicle and/or software for the configuration of the vehicle.

Thus, the data packet contains, on the one hand, information with respect to the order to be carried out such as, e.g., diagnosis and/or configuration of the vehicle and, on the other hand, the corresponding scripts for performing the diagnosis and/or configuration of the vehicle.

According to a preferred development of the present invention, it is provided that, in the vehicle, executable scripts for the diagnosis and/or the configuration of the vehicle are stored.

According to a further preferred development of the present invention, it is provided that in the vehicle, during the execution of a script for the diagnosis and/or the configuration of the vehicle, logging files for the back documentation to the back end unit are generated and stored. By means of the back documentation, both the actual useful data in the form of a useful data protocol and also a sequence protocol for fault analysis can be transmitted to the back end unit and deposited there. The useful data protocol contains the requested useful data such as, for example, error store entries, measurement values [temperature (° C.), voltage (V), etc.] or identifications. With the aid of the sequence protocol, the back end unit can be informed whether the script for the diagnosis or the configuration of the vehicle has been executed correctly and in the case of a faulty execution, suitable measures can be initiated such as, e.g., a repeated execution of the script or the output of an error message.

According to a further preferred development of the present invention, it is provided that a back documentation of the diagnosis and/or configuration of the vehicle performed takes place from the vehicle unit to the back end unit via the air interface. By means of the back documentation via the air interface, the back end unit can be informed immediately whether the diagnosis or the configuration of the vehicle has been executed correctly and suitable measures can be taken immediately.

Embodiments of the present invention further provide a back end unit for the communication with a vehicle unit via an air interface, particularly for carrying out a method which can be designed and developed as described before, characterized in that the back end unit has a data generating module, e.g. an integrated circuit, a processor, a processor core, or multiple thereof configured to execute processor executable instructions, which can generate a data packet which comprises an order for the diagnosis and/or configuration of the vehicle, and the back end unit has a transmit module, e.g. a transceiver, which can send the data packet from the back end unit via the air interface to the vehicle unit.

Embodiments of the present invention further provide a vehicle unit for the communication with a back end unit via an air interface, particularly for carrying out a method which can be designed and developed as described before, characterized in that the vehicle unit has a telematics module which can receive a data packet which comprises an order for the diagnosis and/or configuration of the vehicle, from the back end unit via the air interface, and the vehicle unit has an order processing unit which can evaluate whether a diagnosis and/or a configuration of the vehicle is to be undertaken, and the vehicle unit has a script execution unit which can initiate a diagnosis and/or a configuration of the vehicle. The vehicle unit, telematics module, and order processing unit can each be an integrated circuit, a processor, a processor core, or multiple thereof configured to execute processor executable instructions, or can all be part of the same integrated circuit, processor, processor core, or multiple thereof configured to execute processor executable instructions.

Further details, features and advantages of the invention are obtained from the drawings and from the following description of preferred embodiments by means of the drawings. In this context, the drawings only illustrate illustrative embodiments of the invention which do not limit the essential idea of the invention.

FIG. 1 shows a diagrammatic view of a back end unit and a vehicle unit according to an illustrative embodiment of the present invention, e.g., for performing the method, described above, for the diagnosis and/or configuration of a vehicle.

In this context, the back end unit 100 comprises a data generating module 110 which, via a packet generating module 120, is connected to a transmit module/receive module for packet transport 130 which, in turn, is connected via a back documentation module 140 to a data storage module 150. In the data generating module 110, information and data which define the diagnosis and/or the configuration of a vehicle can be combined in a so-called OTA (OTA=Over The Air) order as is shown by way of example in FIG. 2 and described below. In addition, one or more executable scripts for the diagnosis and/or the configuration of the vehicle and/or software for the configuration of the vehicle can be provided in the data generating module 110 in addition to the OTA order.

In the packet generating module 120, an OTA packet is prepared for the transmission via the air interface to a vehicle unit 200. The OTA packet contains at least one index file for identification of the OTA packet, and the OTA order. In addition, the OTA packet, as mentioned above, can also contain one or more executable scripts for the diagnosis and/or the configuration of the vehicle and/or software for the configuration of the vehicle.

Figure 3:
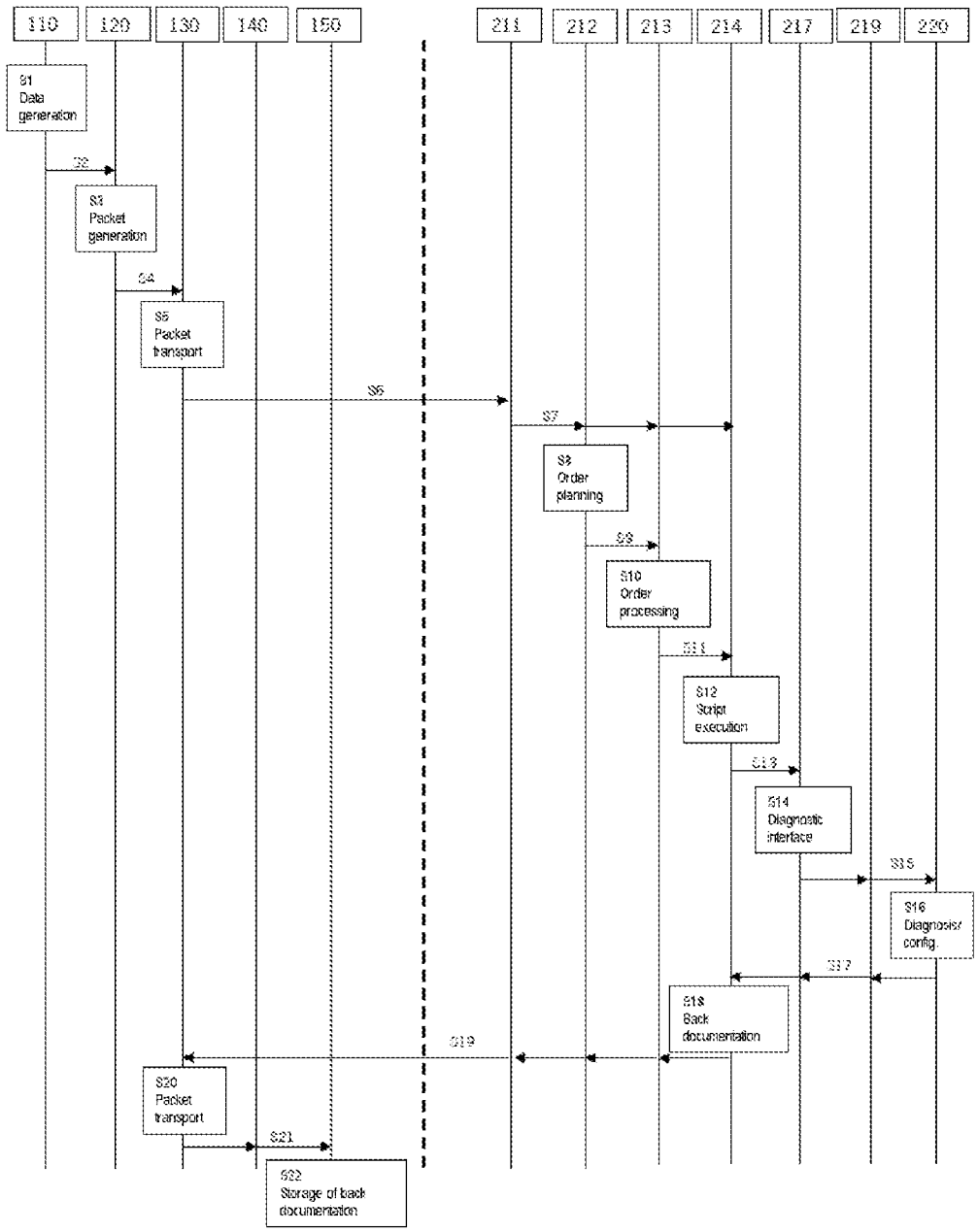
FIG. 3 shows a diagrammatic flowchart of a method for the diagnosis and/or configuration of a vehicle according to an illustrative embodiment of the present invention.

In the vehicle unit 200, the OTA packet received via the air interface is processed in a telematics module 210. For this purpose, the telematics module 210 contains, sequentially connected, a packet client 211, an order planning unit 212, an order processing unit 213, a script execution unit 214, a diagnostic interface 217 and a bus API (API=Application Programming Interface). The script execution unit 214 is here also connected to a script database 215 and to a logging database 216 and the diagnostic interface 217 is also connected to a diagnostic database 218. A more accurate description of the sequence of the processing of the OTA packet in the telematics module 210 is shown in FIG. 3 and described below.

Figure 2:
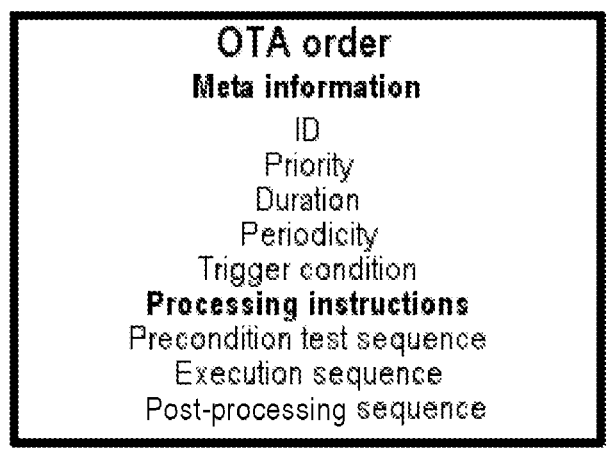
FIG. 2 shows a diagrammatic representation of the information and data contained in an order for the diagnosis and/or configuration of a vehicle according to an illustrative embodiment of the present invention.

The telematics module 210 is connected via the bus API 219 to control devices 220 to 240 in the vehicle FIG. 2 shows a diagrammatic representation of the information and data contained in an OTA order, as described above under FIG. 1, for the diagnosis and/or configuration of a vehicle according to an illustrative embodiment of the present invention.

An OTA order contains so-called meta information such as, e.g., an ID for identification of the OTA order, a priority for the execution of the order, and duration, periodicity and trigger conditions of the OTA order. In addition, an OTA order contains processing instructions such as, e.g., a precondition test sequence, an execution sequence and a post-processing sequence.

The duration corresponds to the estimate of how much time the execution of the OTA order to be planned in will take. The duration can be specified, for example, in minutes or seconds. The periodicity can describe whether the OTA order is to be executed cyclically (periodically at a particular time interval) or only once. Trigger conditions define the criteria which must be met for starting the OTA order. For example, there can be a temporal triggering (e.g. clock time/timer) or an event-based triggering (e.g. terminal 15=off) of the OTA order.

The processing instructions are used for sequentially grading and parametrizing the diagnosis/configuration scripts to be executed, which can contain precondition test sequences, execution sequences and post-processing sequences. The precondition test sequence executes scripts for testing preconditions which are relevant for the execution sequence. Illustrative preconditions can be the status of the parking brake (pulled up/released) or the status of the central locking (locked/unlocked). The execution sequence describes the actual task which is to be executed by the OTA order. The scripts listed in this context are processed (e.g. reading the error store entries). The post-processing sequence is used for placing the vehicle, after execution of the execution sequence, in the target state and for starting measures for eliminating faults which have occurred such as, e.g., an ECU reset.

FIG. 3 shows a diagrammatic flowchart of a method for the diagnosis and/or configuration of a vehicle by using the back end unit 100 and vehicle unit 200 shown in FIG. 1 according to an illustrative embodiment of the present invention.

In the method shown in FIG. 3, the data required for the diagnosis and/or configuration of a vehicle, such as, e.g., the data contained in the OTA order and described under FIG. 2 and one or more executable scripts for the diagnosis and/or configuration of the vehicle, and/or software for the configuration of the vehicle are generated in a first step S1 in the data generating module 110. The data are sent to the packet generating module 120 in a second step S2.

In the creation of packets in a third step S3, an OTA packet is formed from the data obtained in the packet generating module 120. The selection of the data can be generically combined for the respective use case. The minimum range is here an OTA order and an index file, but one or more executable scripts for the diagnosis and/or the configuration of the vehicle and/or software for the configuration of the vehicle can also be contained. In a fourth step S4, the data are sent to the transmit module/receive module for packet transport 130.

In a fifth step S5, the OTA packet previously generated is then converted in the transmit module/receive module for packet transport 130 into a format suitable for the transmission to the vehicle unit 200 via the air interface. In a sixth step S6, the data are sent via the air interface, which is drawn as a dashed line, to the packet client 211 in the telematics module 210.

In the packet client 211, the OTA packet sent by the back end unit 100 is converted into a format suitable for processing in the telematics module 210 and the files contained therein are transferred in a seventh step S7 to the units which are intended to process these data:
- an index file is used in the packet client 211 for breaking down the packet contents
- meta information of the OTA order are transferred to the order planning unit 212 for including the order in the planning
- processing instructions of the OTA order are transferred to the order execution unit 213
- scripts can be transferred to the script database 215 for deposition and for execution
- a flashware is transferred to the diagnostic database 218 for configuring the control devices and thus the vehicle In the order planning unit 212, the meta information mentioned above under FIG. 2, of the OTA order, are then interpreted in an eighth step S8. On the basis of this information, the OTA order is included in the planning and installed by a scheduling mechanism. In a ninth step S9, the order processing is then triggered in accordance with the provided scheduling by the order planning unit 212.

In the order processing unit 213, the processing instruction mentioned above under FIG. 2, of the OTA order, is interpreted in a tenth step S10. In this process, the sequence instructions are run through in steps and executed. In the execution sequence, the scripts for the diagnosis and/or the configuration of the vehicle and/or software for the configuration are called up. Preconditions and post-processing operations are taken into consideration in this process. In an eleventh step S11, the call up of the scripts for the diagnosis and/or the configuration of the vehicle and of any scripts needed for the diagnosis and/or the configuration of the vehicle and/or software for the configuration of the vehicle is sent to the script execution unit 214.

The script execution unit 214 interprets the scripts for the diagnosis and/or the configuration of the vehicle in the twelfth step S12 and executes them. In this context, scripts either already previously stored in the script database 215 in the vehicle or contained in the OTA packet can be executed. At the same time, a logging is generated during the execution and deposited in a logging database 216 which, among other things, is used for back documentation to the back end unit 100. The scripts for the diagnosis and/or the configuration of the vehicle can then be based, e.g., on the so-called Open Test Sequence Exchange (OTX) standard. In a thirteenth step S13, the diagnostic interface 217 is then addressed in order to be able to access diagnostic data in the diagnostic database 218.

The diagnostic interface 217 represents the interface between the script execution unit 214, the diagnostic data and the bus API 219. In the fourteenth step S14, in consequence, the diagnostic interface 217 enables the diagnostic data which are needed for executing the scripts for the diagnosis and/or the configuration of the vehicle to be accessed. The diagnostic interface can here specifically be, for example, a so-called MVCI server (MVCI=Modular Vehicle Communication Interface), and the diagnostic data can for example be represented concretely in the so-called Open Diagnostic Data Exchange (ODX) standard for specification of the control device diagnosis and converted for a high-performance access in a runtime-capable format.

In the fifteenth step S15, the access of the diagnostic interface 217 takes place via the bus API 219 to the respective bus system and the control device 220 connected thereto, to be diagnosed or to be provided with new software.

In the sixteenth step S16, corresponding control device data are read out of the control device 220, depending on the OTA order, or the control device 220 is reconfigured with corresponding software.

In the seventeenth step S17, information about the diagnosis carried out or the configuration with new software, needed for back documentation, is sent from the control device 220 via the bus API 219 and the diagnostic interface 217 to the script execution unit 214.

In the eighteenth step S18, the information needed for the back documentation is sent from the script execution unit 214 to the logging database 216 for storage. In the nineteenth step S19, logging files are sent for the back documentation from the logging database 216 via the script execution unit 214 and the air interface to the transmit module/receive module for packet transport 130 in which a format conversion is performed in the twentieth step S20.

In the twenty-first step S21, the logging files for the back documentation are sent to the back documentation module 140 for data processing and on to the data storage module 150 in which the processed logging files are deposited in a twenty-second step S22 and stored.

In the example described above for the diagnosis and/or configuration of a vehicle according to an embodiment of the invention, the data can also be encrypted in the back end unit 100 in the OTA packet and/or the communication over the air interface can take place via an encrypted channel.

As an example for the sequence of a diagnosis, the determination of the oil temperature can be utilized. For this purpose, the determination of the oil temperature is specified as an order in the OTA order and a corresponding script for the determination of the oil temperature is added in the OTA packet. Alternatively, the corresponding script can also already be stored in the script database 215 in the vehicle unit 200.

After execution of the script in the script execution unit 214, an interface call up with identifiers (so-called short names) and parameters for determining machine-readable request PDUs (PDU=Protocol Data Unit) via the diagnostic interface 217. Thereupon, the diagnostic interface 217 can perform the abstraction by means of the diagnostic database 218. For example, a corresponding short name for the determination of the oil temperature can be sent to the diagnostic database 218 at the interface call up. In the diagnostic database 218, a so-called request PDU (PDU=Protocol Data Unit) which contains a description of the inquiry for determining the oil temperature in the ODX standard is generated and sent via the diagnostic interface 217 and the bus API 219 to the control device 220.

The control device 220 sends the oil temperature in the form of a so-called response PDU via the bus API 219 and the diagnostic interface 217 to the diagnostic database 218. In the diagnostic database 218, the oil temperature is determined with value and unit from the response PDU and returned to the script execution unit 214 via the diagnostic interface 217. The oil temperature is stored as useful data protocol which is deposited in the logging database 216. The results of the script execution are returned to the order processing unit 213 and sent via the air interface to the back documentation module 140 for data processing and the data storage module 150 for deposition and storage of the oil temperature.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for conducting a diagnosis of a vehicle or a configuration of a vehicle, the method comprising:
    wireless receiving by the vehicle a data packet which comprises an order to conduct the diagnosis or the configuration of the vehicle and a runtime executable script, which when executed, causes the diagnosis or the configuration of the vehicle to be performed according to the order,
    evaluating the data packet to determine whether the diagnosis and/or the configuration of the vehicle is to be undertaken, and
    initiating the diagnosis or the configuration of the vehicle by executing the runtime executable script.

2. The method as claimed in claim 1,
    wherein the method conducts the configuration of the vehicle,
    wherein the data packet further contains software for the configuration of the vehicle, and
    and wherein the method further comprises interpreting the runtime executable script to determine instructions for installing the software and executing the instructions to install the software in the vehicle.

3. The method as claimed in claim 1, wherein, in the vehicle, additional runtime executable scripts for the diagnosis or the configuration of the vehicle are stored.

4. The method as claimed in claim 1, wherein diagnostic data, which is used when executing the runtime executable script for the diagnosis or configuration of the vehicle, is stored in the vehicle.

5. The method as claimed in claim 1, wherein in the vehicle, during the execution of the runtime executable script for the diagnosis or the configuration of the vehicle, logging files for documentation are generated and stored.

6. The method as claimed in claim 1, wherein documentation data of the diagnosis or the configuration of the vehicle performed is wirelessly transmitted for storage.

7. The method of claim 6, wherein the documentation data comprises at least one of error information corresponding to an error state of the vehicle or measurement values corresponding to measurements made during the diagnosis or the configuration of the vehicle.

8. The method of claim 6, wherein the documentation data comprises sequence protocol data corresponding to an actual sequence of the execution of the runtime executable script.

9. The method of claim 1, wherein the order of the packet is a data structure representing information and data which defines the diagnosis and/or the configuration of a vehicle.

10. The method of claim 9, wherein the order further comprises meta information comprising at least one of an identification of the order, a priority for the execution of the order, a duration of the order, a periodicity of the order, or trigger conditions for executing the order.

11. The method of claim 9, wherein the order further comprises processing instructions comprising at least one of a precondition test sequence, an execution sequence, or a post-processing sequence.

12. The method of claim 1, the method further comprising interpreting the runtime executable script, the runtime executable script being based on the Open Test Sequence Exchange standard, wherein the execution of the runtime executable script is based on the interpreting method step.

13. The method of claim 1,
    wherein the method conducts the diagnosis of the vehicle,
    the order is to conduct the diagnosis of the vehicle, and
    the runtime executable script, when executed causes the diagnosis of the vehicle to be performed according to the order,
    wherein the data packet is evaluated to determine whether the diagnosis of the vehicle is to be undertaken, and
    wherein the diagnosis of the vehicle is initiated by executing the runtime executable script.

14. The method of claim 13, the method further comprising:
determining an identifier corresponding to a vehicle telemetry by executing the runtime readable script,
determining a description of an inquiry for determining a value for the vehicle telemetry based on the identifier,
performing the inquiry to receive the value, and
storing the value.

15. The method of claim 1, wherein the method conducts the configuration of the vehicle, wherein the order is to conduct the configuration of the vehicle, wherein the runtime executable script, when executed, causes the configuration of the vehicle to be performed according to the order, wherein the evaluating of the data packet determines that the configuration is to be undertaken, and the configuration is initiated by executing the runtime executable script.

16. The method of claim 1, wherein the data packet is a data structure comprising at least two sub-packets of data, a first sub-packet containing data representing the order and a second sub-packet containing data representing the runtime executable script, wherein the order defines how and what configuration and/or diagnosis is performed.

17. A back end unit in wireless communication with a vehicle, the back end unit comprising a processor and a memory storing processor executable instructions, which when executed by the processor cause the back end unit to:
generate a data packet which, comprises an order for conducting a diagnosis on the vehicle or a configuration of the vehicle and comprises a runtime executable script, which when executed, causes the diagnosis or the configuration of the vehicle to be performed according to the order; and
wirelessly send the data packet to the vehicle.

18. The back end unit as claimed in claim 17,
wherein the order is for conducting the configuration of a vehicle,
wherein the data packet further comprises software for the configuration of the vehicle, and
and wherein the runtime executable script is configured such that, when interpreted and then executed by the vehicle, the runtime executable script causes the vehicle to install the software.

19. A vehicle unit of a vehicle in wireless communication with a back end system external to the vehicle, the vehicle unit comprising a processor and a memory storing processor executable instructions, which when executed by the processor cause the vehicle unit to:
wirelessly receive a data packet, which includes an order for conducting a diagnosis of the vehicle or a configuration of the vehicle and comprises a runtime executable script, which when executed, causes the diagnosis or the configuration of the vehicle to be performed according to the order,
evaluate the data packet to determine whether the diagnosis or the configuration of the vehicle is to be undertaken, and
execute the runtime executable script to initiate the diagnosis or the configuration of the vehicle.

20. A system for conducting a diagnosis or a configuration of a vehicle, the system comprising:
a back end unit in wireless communication with a vehicle unit, the back end unit comprising a processor and a memory storing instructions, which when executed by the processor of the back end unit cause the back end unit to:
generate a data packet which comprises an order for conducting the diagnosis on the vehicle or the configuration of the vehicle and comprises a runtime executable script, which when executed, causes the diagnosis or the configuration of the vehicle to be performed according to the order; and
wirelessly send the data packet to the vehicle unit, and
the vehicle unit in wireless communication with the back end unit, the vehicle unit comprising a processor and a memory instructions, which when executed by the processor cause the back end unit to:
receive the data packet,
evaluate the data packet to determine whether the diagnosis or the configuration of the vehicle is to be undertaken, and
execute the runtime executable script to initiate the diagnosis or the configuration of the vehicle.

* * * * *